United States Patent
Komiya et al.

(10) Patent No.: US 8,198,851 B2
(45) Date of Patent: Jun. 12, 2012

(54) MOTOR CONTROLLER

(75) Inventors: Takehiko Komiya, Fukuoka (JP); Kazuhide Takao, Fukuoka (JP); Keisei Inoki, Fukuoka (JP); Shuichi Mihara, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 261 days.

(21) Appl. No.: 12/698,147

(22) Filed: Feb. 2, 2010

(65) Prior Publication Data
US 2010/0194327 A1  Aug. 5, 2010

Related U.S. Application Data

(63) Continuation of application No. PCT/JP2008/062467, filed on Jul. 10, 2008.

(30) Foreign Application Priority Data
Aug. 3, 2007 (JP) .............................. P. 2007-202758

(51) Int. Cl.
*G05B 5/01* (2006.01)

(52) U.S. Cl. ........ 318/611; 318/561; 318/629; 318/607; 318/632; 700/280; 700/275; 180/446

(58) Field of Classification Search .................. 318/606, 318/632, 625, 563, 611, 629, 636, 561, 607; 318/128; 267/140.15; 73/504.13, 504.12; 369/53.18, 44.32; 700/280, 275; 180/446
See application file for complete search history.

(56) References Cited

U.S. PATENT DOCUMENTS

| | | | |
|---|---|---|---|
| 6,211,640 B1 | 4/2001 | Fujisaki et al. | |
| 7,501,783 B2* | 3/2009 | Imadu et al. | 318/611 |
| 2004/0239279 A1* | 12/2004 | Komiya et al. | 318/606 |

FOREIGN PATENT DOCUMENTS

| | | | | |
|---|---|---|---|---|
| JP | 10-176948 | | | 6/1998 |
| JP | 10176948 A | * | | 6/1998 |
| JP | 2000-278990 | | | 10/2000 |
| JP | 2003-134868 | | | 5/2003 |
| JP | 2005-045937 | | | 2/2005 |
| JP | 2005045937 A | * | | 2/2005 |
| JP | 2006221404 A | * | | 8/2006 |

OTHER PUBLICATIONS

Honda et al. Zukaito jikken de manabu digital servo no riron to jissen Jun. 30, 1998, pp. 42 to 47, Nikkan kogyo shinbun sha, Tokyo, Japan.

* cited by examiner

*Primary Examiner* — Walter Benson
*Assistant Examiner* — Jorge Carrasquillo
(74) *Attorney, Agent, or Firm* — Ditthavong Mori & Steiner, P.C.

(57) ABSTRACT

A motor controller capable of detecting an oscillation of a feedback loop and performing gain adjustment while updating a gain value of a control unit is provided. The motor controller includes an electric motor, an operation-amount detector, a control unit, a machine, a disturbance signal generator which generates a sweep sine wave, a compensation-driving-force detector, a vibration calculator, an oscillation detector, a vibration storage, a simulated open-loop gain calculator, a gain changer, and an automatic gain changer, and detects an oscillation by processing a response signal in time series on the basis of a first threshold regarding to a magnitude of vibration and a second threshold regarding a frequency.

11 Claims, 15 Drawing Sheets

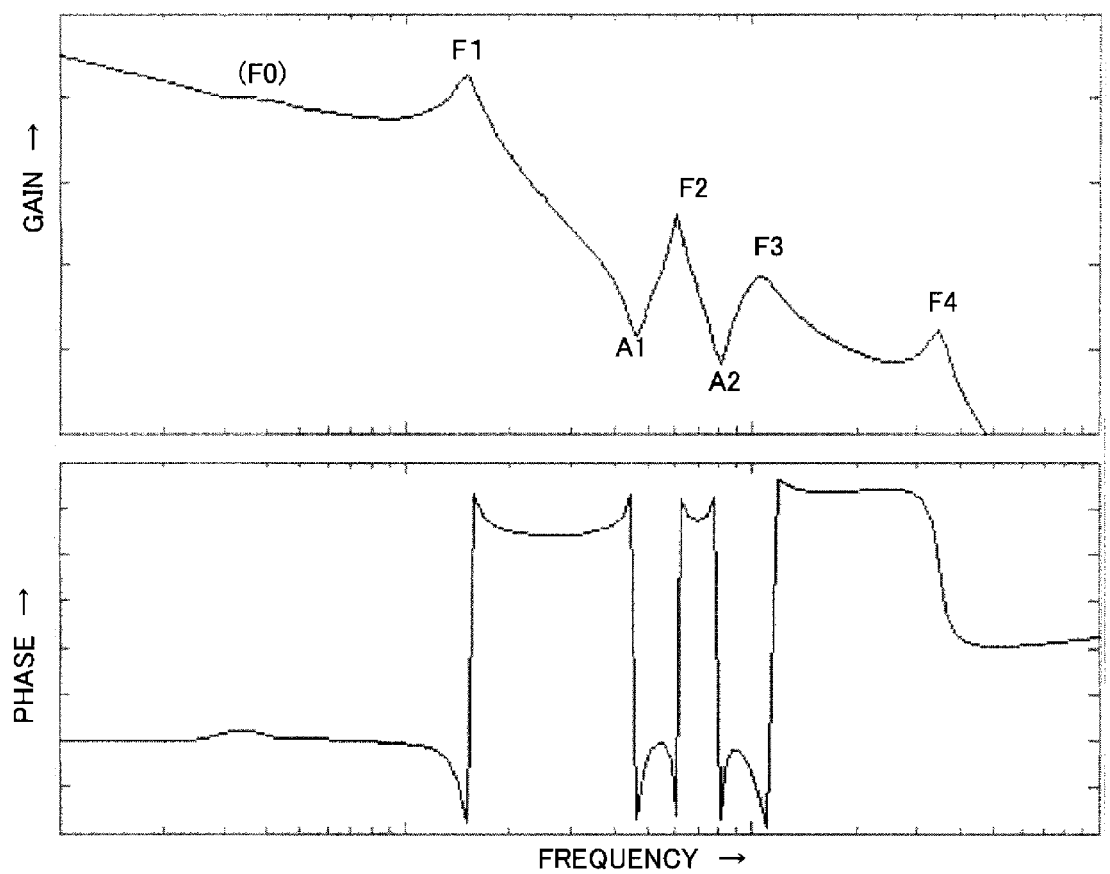

MOTOR CONTROLLER

CROSS-REFERENCE TO RELATED APPLICATIONS

The present application is a continuation application of PCT/JP2008/062467, filed Jul. 10, 2008, which claims priority to Japanese Patent Application No. 2007-202758, filed Aug. 3, 2007. The contents of these applications are incorporated herein by reference in their entirety.

BACKGROUND OF THE INVENTION

1. Field of the Invention

The present invention relates to a motor controller included in a positioning apparatus for a semiconductor manufacturing apparatus, a machine tool, or an industrial robot. More specifically, the present invention relates to a motor controller with which a gain margin can be simply evaluated by adding a sweep sine wave to a driving force as a disturbance signal and detecting an oscillation of a feedback loop of a control unit on the basis of a first threshold based on the magnitude of vibration and a second threshold based on a vibration frequency.

2. Discussion of the Background

A method for extracting a limit gain of a servo control apparatus according to a related art is described in, for example, Japanese Unexamined Patent Application Publication No. 2005-45937. According to this method, to extract a limit gain of a servo control apparatus capable of automatically setting an optimum control gain, the servo control apparatus is provided with vibration detecting means and vibrating means which adds a simulated disturbance torque to a torque command. The simulated disturbance torque generates vibration of a certain level when a control gain is increased. Processes of applying vibration after making an adjustment, causing the vibration detection means to detect the vibration, and adding the simulated disturbance torque while increasing a control gain unless vibration of a certain level is detected are repeated, and a control gain at which vibration with a level that exceeds the certain level is detected is determined as the limit gain. A maximum gain is determined in advance, and the control gain is set below the maximum gain.

SUMMARY OF THE INVENTION

According to one aspect of the present invention, a motor controller includes a control unit which receives a detection signal from an operation-amount detector and generates a driving force for driving an electric motor in response to a command signal, the operation-amount detector detecting an amount of operation of the electric motor or a machine, the control unit providing a feedback loop for controlling the electric motor such that the amount of operation matches the command signal; a disturbance signal generator which adds a disturbance signal to the driving force generated by the control unit; a compensation-driving-force detector which detects the driving force generated by the control unit; a vibration calculator which calculates a magnitude of vibration and a vibration frequency, the magnitude of vibration being calculated on the basis of an absolute value or a square value of a signal detected by the compensation-driving-force detector or the operation-amount detector; and an oscillation detector which detects an oscillation of the feedback loop by evaluating the signal detected by the compensation-driving-force detector or the operation-amount detector on the basis of at least one first predetermined threshold based on a magnitude of the signal detected by the compensation-driving-force detector or the operation-amount detector and at least one second predetermined threshold based on the vibration frequency.

According to an embodiment, a gain adjusting method includes a step of detecting an oscillation of the feedback loop by evaluating the driving force generated by the control unit or the signal from the operation-amount detector on the basis of at least one first predetermined threshold based on a magnitude of the driving force generated by the control unit or the signal from the operation-amount detector which detects the amount of operation of the electric motor or the machine and at least one second predetermined threshold based on the vibration frequency.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 26 is a diagram illustrating the characteristics of the electric motor and the machine in the motor controller according to the third embodiment.

DESCRIPTION OF THE EMBODIMENTS

Figure 1:
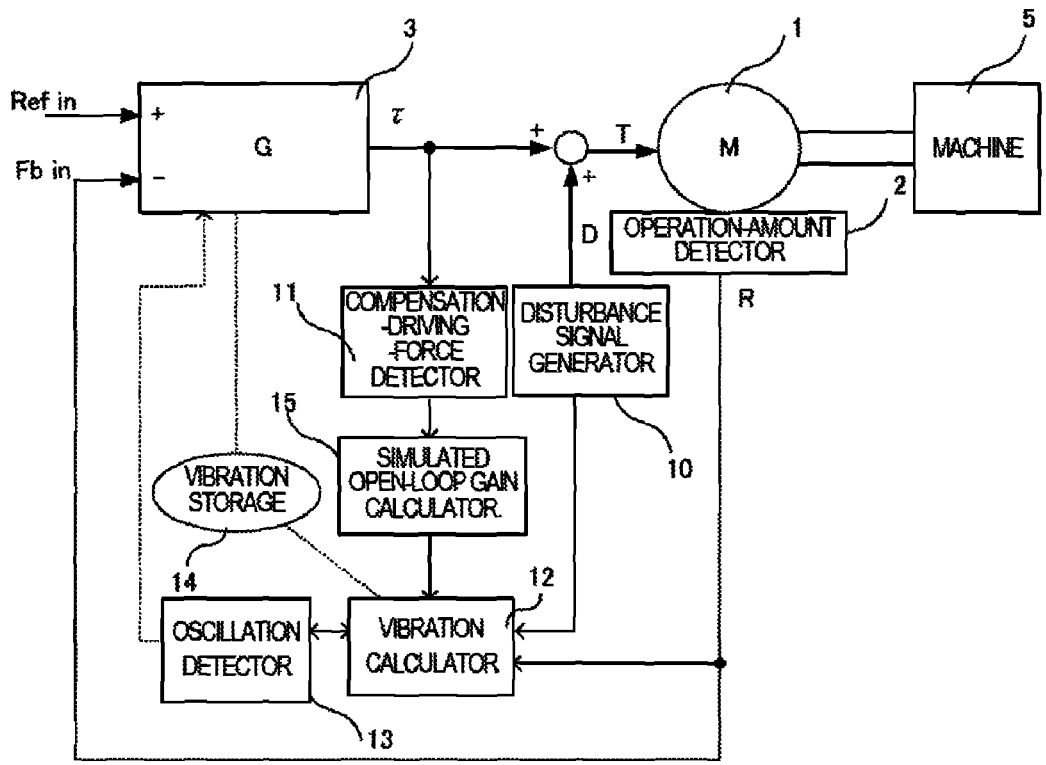
FIG. 1 is a diagram illustrating the structure of a motor controller according to a first embodiment.

Embodiments will now be described with reference to the accompanying drawings, wherein like reference numerals designate corresponding or identical elements throughout the various drawings.

Embodiments of the present invention will be described with reference to the drawings.

Although various functions and means are mounted in actual motor controllers, only functions and means related to the present invention are shown in the diagrams and described herein. In addition, in the following description, components having the same names are basically denoted by the same reference numerals, and redundant explanations thereof are thus omitted.

A first embodiment of the present invention will now be described with reference to the drawings.

FIG. 1 is a diagram illustrating the structure of a motor controller according to a first embodiment.

Figure 2:
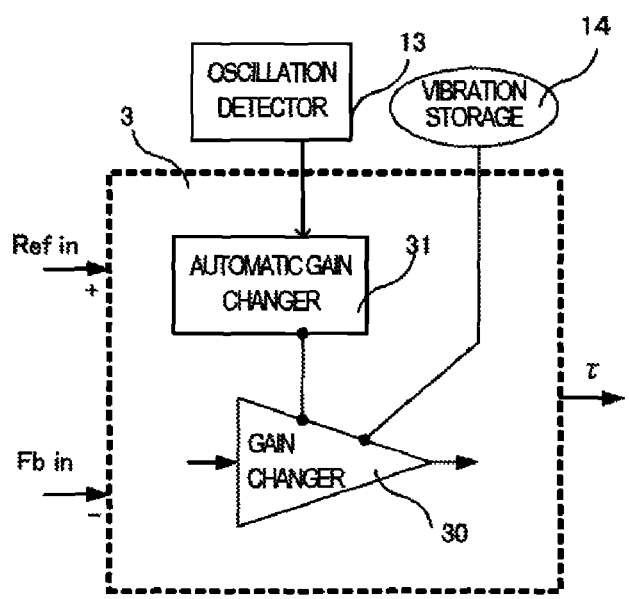
FIG. 2 is a diagram illustrating the structure of a control unit according to the first embodiment.

FIG. 2 is a diagram illustrating the structure of a control unit according to the first embodiment.

In FIG. 1, reference numeral 1 denotes an electric motor, 2 denotes a detector, 3 denotes a control unit, 5 denotes a machine, 10 denotes a disturbance signal generator, 11 denotes a compensation-driving-force detector, 12 denotes a vibration calculator, 13 denotes an oscillation detector, 14 denotes a vibration storage, and 15 denotes a simulated open-loop gain calculator.

In addition, in FIG. 2, reference numeral 30 denotes a gain changer and 31 denotes an automatic gain changer. The oscillation detector 13 detects an oscillation on the basis of a first threshold and a second threshold (not shown).

Figure 3:
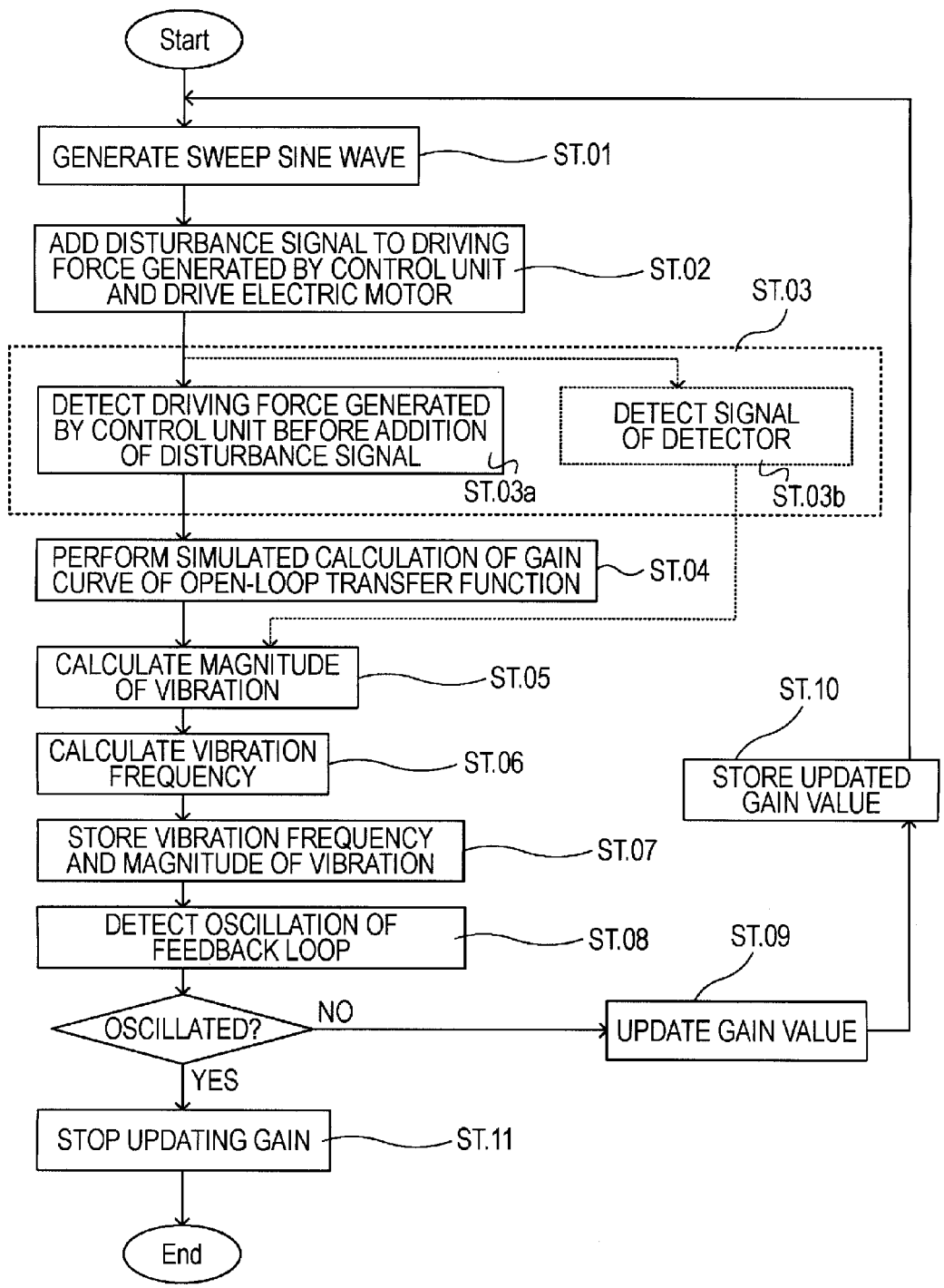
FIG. 3 is a flowchart illustrating the procedure of a gain adjusting method for the motor controller according to the first embodiment.

FIG. 3 is a flowchart illustrating the procedure of a gain adjusting method for the motor controller according to the first embodiment.

Referring to FIG. 3, ST.01 is a step of generating a sweep sine wave, and ST.02 is a step of adding a disturbance signal to a driving force generated by the control unit 3 and driving the electric motor 1. ST.03 is a step of detecting the driving force generated by the control unit 3 (ST.03a) or a step of detecting a signal of the detector 2 (ST.03b), and ST.04 is a step of performing simulated calculation of a gain curve of an open-loop transfer function. ST.05 is a step of detecting the magnitude of vibration, ST.06 is a step of detecting a vibration frequency, and ST.07 is a step of storing the vibration frequency and the magnitude of vibration. ST.08 is a step of detecting an oscillation of a feedback loop, and ST.09 is a step of updating a gain value. ST.10 is a step of storing the updated gain value, and ST.11 is a step of stopping the process of updating the gain value.

In the operation of the motor controller, the procedure shown in FIG. 3 is carried out to adjust the gain value of the control unit 3 by updating the gain value of the control unit 3 and detecting an oscillation.

Before describing the operation in detail, the basic principle of the first embodiment of the present invention will be described.

Figure 4:
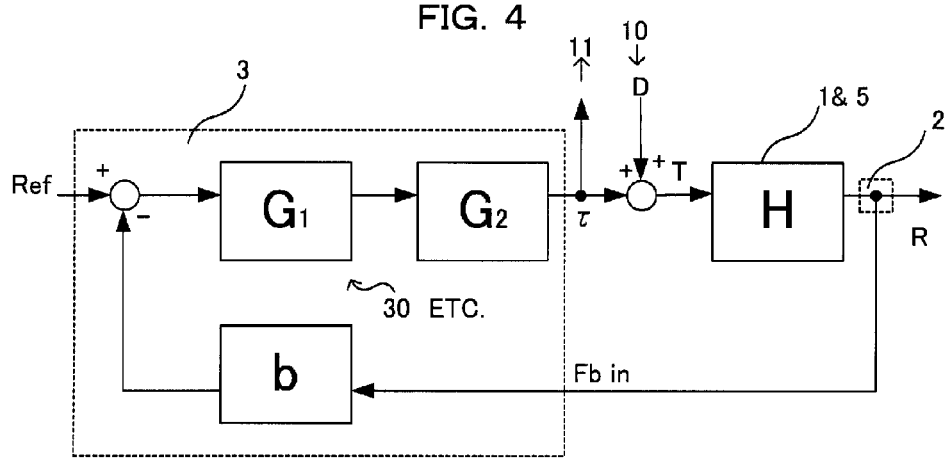
FIG. 4 is a simplified block diagram illustrating the calculation of a gain curve of a simulated open-loop transfer function performed by a simulated open-loop gain calculator included in the motor controller according to the first embodiment (FIG. 4 is also a simplified block diagram illustrating the calculation of an open-loop transfer function performed by an open-loop transfer function calculator)

FIG. 4 is a simplified block diagram illustrating the calculation of a gain curve of a simulated open-loop transfer function performed by a simulated open-loop gain calculator included in the motor controller according to the first embodiment. In FIG. 4, $G_1$ denotes a first control unit, $G_2$ denotes a second control unit, b denotes a feedback compensator, and H denotes a machine. The machine H includes the characteristics of both the electric motor and the machine to be controlled.

An open-loop transfer function Zo is calculated as follows. That is, first, a disturbance signal D shown in FIG. 4 and a driving force $\tau$ generated by the control unit 3 are measured, and a closed-loop characteristic Zc is calculated from Equation (1). Then, the open-loop transfer function Zo is calculated from Equation (2).

$$Z_C(\omega) = \frac{\tau(\omega)}{D(\omega)} = -\frac{b(\omega) \cdot H(\omega) \cdot G_1(\omega) \cdot G_2(\omega)}{1 + b(\omega) \cdot H(\omega) \cdot G_1(\omega) \cdot G_2(\omega)} = -\frac{Z_O(\omega)}{1 + Z_O(\omega)} \quad \text{Eq. (1)}$$

$$Z_O(\omega) = -\frac{Z_C(\omega)}{1 + Z_C(\omega)} = b(\omega) \cdot H(\omega) \cdot G_1(\omega) \cdot G_2(\omega) \quad \text{Eq. (2)}$$

Here, $\tau(\omega)$ and $D(\omega)$ are obtained as a result of frequency analysis of the driving force $\tau$ and the disturbance signal D, respectively, and the closed-loop characteristic $Zc(\omega)$ is simply obtained by dividing the driving force $\tau(\omega)$ by the disturbance signal $D(\omega)$ as in Equation (1).

Since the closed-loop characteristic $Zc(\omega)$ is constituted by the open-loop transfer function $Zo(\omega)$, the open-loop transfer function $Zo(\omega)$ can be obtained by a calculation according to Equation (2).

However, a high-performance operation device capable of performing frequency analysis is necessary to carry out this method. In addition, it is inefficient to calculate the open-loop transfer function $Zo(\omega)$ each time the gain value is changed.

Figure 5:
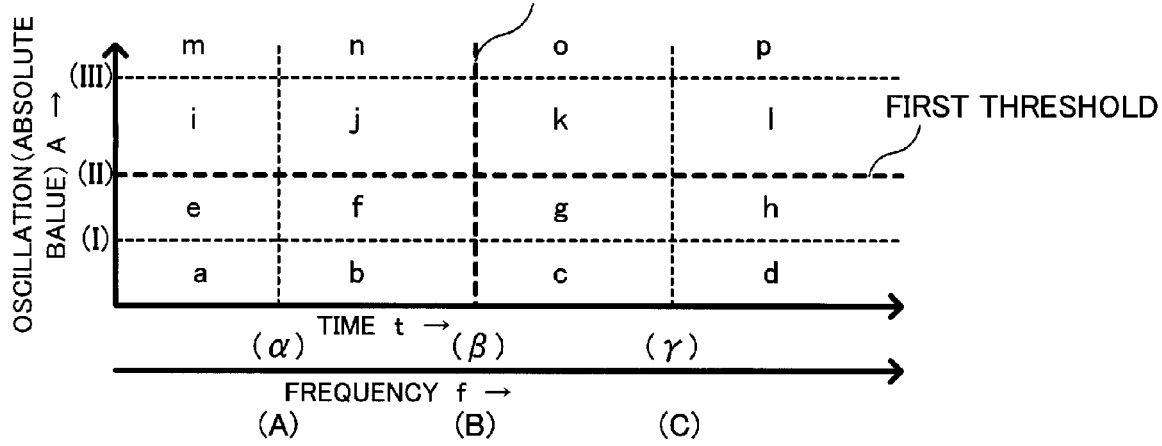
FIG. 5 is a conceptual diagram of an oscillation detection based on a first threshold and a second threshold according to the first embodiment.

FIG. 5 is a conceptual diagram of an oscillation detection based on the first threshold and the second threshold according to the first embodiment. Values obtained by processing the signal from the compensation-driving-force detector 11 are inserted into the graph shown in FIG. 5, and an oscillation is detected on the basis of the first threshold and the second threshold.

The first threshold is a threshold for the vertical axis of the graph shown in FIG. 5, and is used as a criterion for evaluating the magnitude of the signal. The second threshold is a threshold for the horizontal axis of the graph shown in FIG. 5, and is used as a criterion for evaluating the frequency. The frequency is evaluated as follows. That is, the frequency output from the disturbance signal generator 10 is known. If it is assumed that the frequency of the response signal depends on the frequency of the input signal, the frequency at any time of the signal from the compensation-driving-force detector 11 can be determined. This is used to evaluate the frequency.

The signal from the compensation-driving-force detector 11 is the response to the sweep sine wave, and includes negative and positive values. Therefore, the absolute value of the signal is used. A signal from the detector 2 can also be subjected to the evaluation using thresholds for the vertical axis and the horizontal axis.

Figure 6:
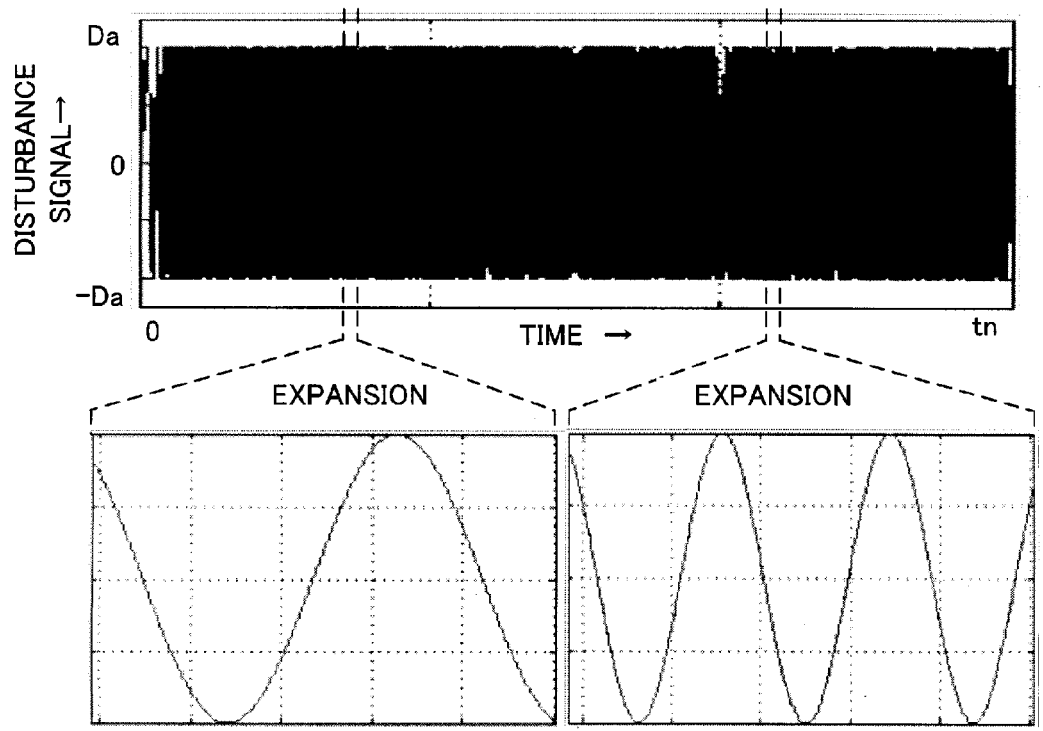
FIG. 6 is a diagram illustrating a sweep sine wave which functions as a disturbance signal according to the first embodiment.

FIG. 6 is a diagram illustrating the sweep sine wave which functions as the disturbance signal according to the first embodiment. The sweep sine wave is obtained by linearly changing the frequency of a sine wave from 0 Hz to Fmax Hz in to seconds.

Figure 7:
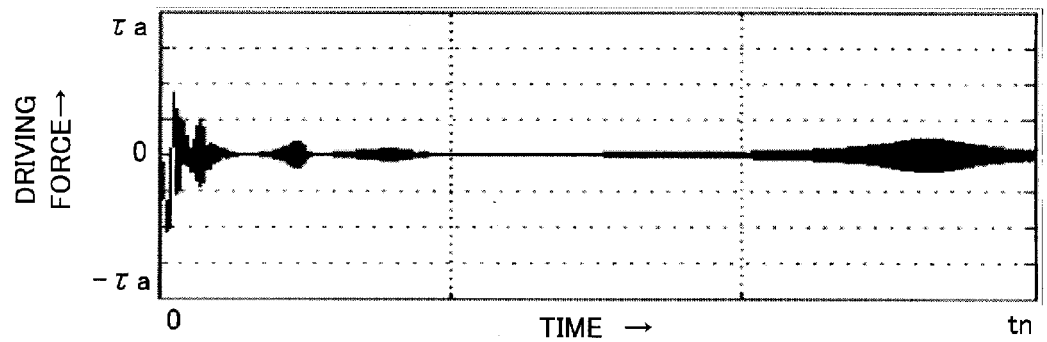
FIG. 7 is a diagram illustrating a driving force before the addition of the disturbance signal according to the first embodiment.
Figure 8:
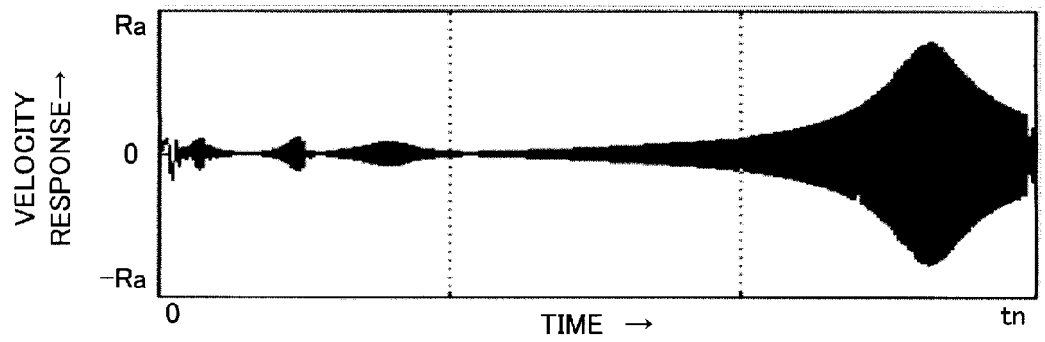
FIG. 8 is a diagram illustrating a response detected by a detector when the disturbance signal is input according to the first embodiment.

FIG. 7 is a diagram illustrating the driving force before the addition of the disturbance signal according to the first embodiment, and FIG. 8 is a diagram illustrating the response detected by the detector when the disturbance signal is input according to the first embodiment. In the motor controller having the structure shown in FIG. 1 or FIG. 4, when the sweep sine wave shown in FIG. 6 is applied as the disturbance signal, the response signal shown in FIG. 7 is obtained from the compensation-driving-force detector 11 and the response signal shown in FIG. 8 is obtained from the detector 2.

Figure 9:
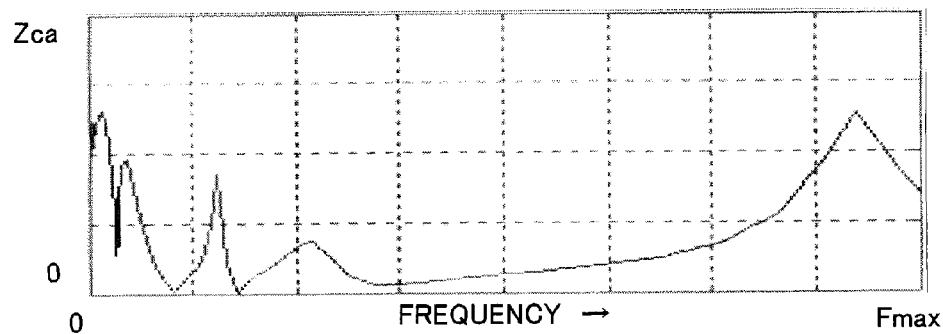
FIG. 9 is a diagram illustrating the closed-loop characteristic according to the first embodiment.

FIG. 9 is a diagram illustrating the closed-loop characteristic according to the first embodiment. The graph shown in FIG. 9 is obtained as a result of calculation of the closed-loop characteristic of the structure shown in FIG. 1 or FIG. 4. Note that although logarithmic scales (LOG, dB) are generally used on both vertical and horizontal axes in a graph showing the closed-loop characteristic, linear scales are used on both vertical and horizontal axes in FIG. 9. As shown in Equation (1), the closed-loop characteristic $Zc(\omega)$ can be calculated from the disturbance signal $D(\omega)$ and the driving force $\tau(\omega)$.

Figure 10:
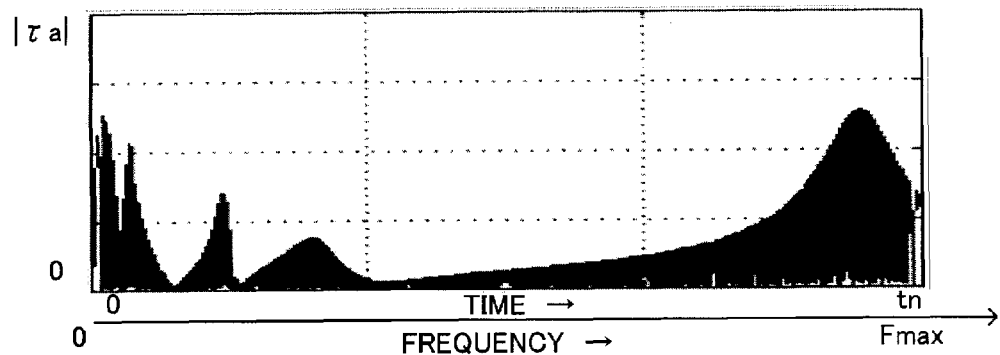
FIG. 10 is a diagram illustrating the absolute value of the driving force before the addition of the disturbance signal according to the first embodiment.

FIG. 10 is a diagram illustrating the absolute value of the driving force before the addition of the disturbance signal according to the first embodiment.

Since the disturbance signal D is the sweep sine wave and the amplitude thereof is constant, the disturbance signal $D(\omega)$ has the constant amplitude in the frequency range in which the frequency is swept. Therefore, the shape of the graph showing the gain of the closed-loop characteristic $Zc(\omega)$ in FIG. 9 is qualitatively close to that of the graph showing only the driving force $\tau(\omega)$. This can also be said for the graphs versus time. In addition, since the characteristics of frequency are shown on the horizontal axis due to the sweep sine wave, when a graph is drawn by plotting the absolute value of amplitude of the driving force $\tau(t)$ in time series on the vertical axis, as shown in FIG. 10, a graph having the shape close to that of the graph showing the gain of the closed-loop characteristic $Zc(\omega)$ (FIG. 9) is obtained.

Figure 11:
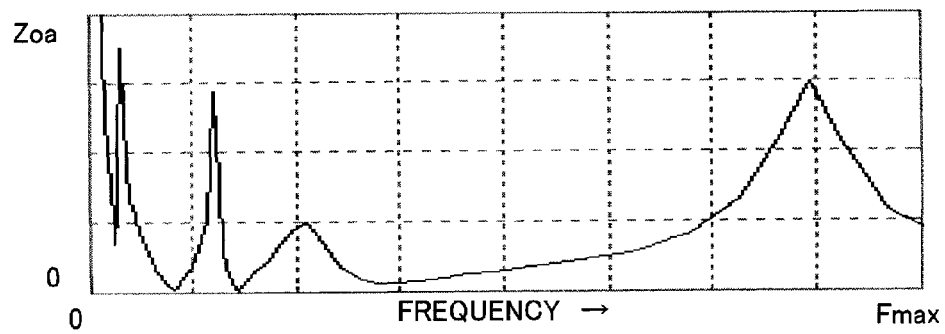
FIG. 11 is a diagram illustrating the open-loop transfer function according to the first embodiment.
Figure 12:
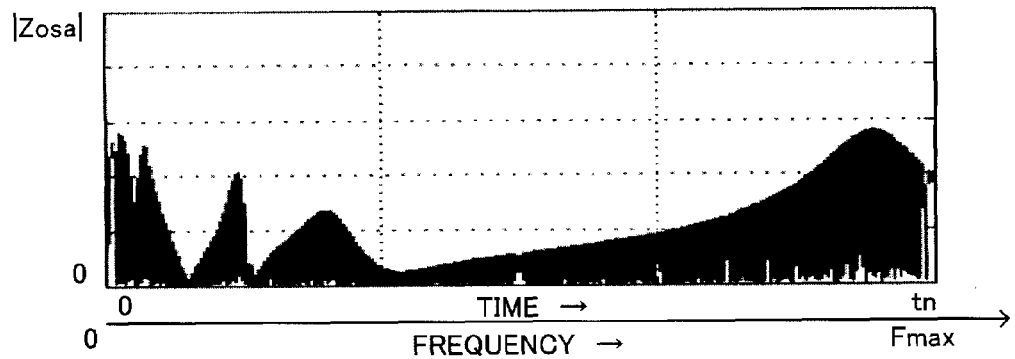
FIG. 12 is a diagram illustrating the result of simulated calculation of a gain curve of the open-loop transfer function based on the driving force before the addition of the disturbance signal according to the first embodiment.

FIG. 11 is a diagram illustrating the open-loop transfer function according to the first embodiment. FIG. 12 is a diagram illustrating the result of simulated calculation of a gain curve of the open-loop transfer function based on the driving force before the addition of the disturbance signal according to the first embodiment. Similar to FIG. 9, linear scales are used on both the vertical and horizontal axes in FIG. 11.

Similar to the relationship between FIGS. 9 and 10, the graph shown in FIG. 12 is obtained by causing the simulated open-loop gain calculator 15 to perform a calculation corresponding to Equation (2) using the absolute value of the driving force $\tau(t)$ in time series. The shape of the graph shown in FIG. 12 is qualitatively close to that of the gain curve of the open-loop transfer function (FIG. 11). Therefore, the graph shown in FIG. 12 can be used as the gain curve of a simple, simulated open-loop transfer function.

By using the above-described phenomenon, the gain adjustment can be performed by the procedure shown in FIG. 3.

First, in step ST.01, which is the step of generating the sweep sine wave, the disturbance signal generator 10 generates the sweep sine wave shown in FIG. 6 as the disturbance signal.

Then, the procedure proceeds to step ST.02, which is the step of adding the disturbance signal to the driving force generated by the control unit 3 and driving the electric motor 1, and the electric motor 1 is driven accordingly. At this time, the command input (input to Refin in FIG. 1) supplied to the control unit 3 may be set to 0. When the electric motor 1 is driven, the machine 5 is activated by the driving force corresponding to the disturbance signal. The detector 2 detects the amount of operation of the electric motor 1 and feeds the detected amount of operation to the control unit 3. The control unit 3 outputs a compensation driving force which compensates for the amount of operation of the electric motor 1 so that the output becomes equal to the command input 0 supplied to the control unit 3.

Thus, step ST.03a, which is the step of detecting the driving force generated by the control unit 3 and step ST.03b, which is the step of detecting the signal of the detector 2, are performed. The compensation-driving-force detector 11 detects the compensation driving force as shown in FIG. 7, and the detector 2 detects the amount of operation as shown in FIG. 8.

Next, the procedure proceeds to step ST.04, which is the step of performing simulated calculation of the gain curve of the open-loop transfer function, and the simulated open-loop gain calculator 15 calculates the gain curve of the simulated open-loop transfer function as shown in FIG. 12 on the basis of the compensation driving force detected by the compensation-driving-force detector 11 as shown in FIG. 7. The gain value of the simulated closed-loop characteristic as shown in FIG. 10 may also be calculated from the amount of operation detected by the detector 2 as shown in FIG. 8.

Then, in step ST.05, which is the step of detecting the magnitude of vibration, the signal magnitude is detected on the basis of the signal from the compensation-driving-force detector 11 or the signal from the detector 2. Then, in step ST.06, which is the step of detecting the vibration frequency, the vibration frequency is detected on the basis of the frequency of the input sweep sine wave corresponding to the time point at which the signal magnitude is large.

If the detection result from the compensation-driving-force detector 11 is processed in step ST.04 to obtain the gain curve of the simulated open-loop transfer function, the process performed in step ST.04 is equivalent to a simplified calculation of the open-loop transfer function shown in FIG. 11. Steps ST.05 and ST.06 are performed by the vibration calculator 12.

Since the signal magnitude and the vibration frequency are detected, in step ST.07, which is the step of storing the vibration frequency and the magnitude of vibration, the signal magnitude and the vibration frequency are stored in the vibration storage 14. Here, there may be a plurality of signal magnitudes and vibration frequencies.

Next, the procedure proceeds to step ST.08, which is the step of detecting an oscillation of the feedback loop. In step ST.08, the oscillation detector 13 detects an oscillation on the basis of the signal magnitudes and the vibration frequencies using the first threshold for the signal magnitudes and the second threshold for the vibration frequencies, as shown in FIG. 5.

If the oscillation is not detected, the procedure proceeds to step ST.09, which is the step of updating the gain value. In step ST.09, the automatic gain changer 31 changes the gain value of the gain changer 30 included in the control unit 3 shown in FIG. 2. Generally, the gain value is started from a low value, and is increased.

After the gain value of the control unit 3 is updated, in step ST.10, which is the step of storing the updated gain value, the updated gain value is stored in the vibration storage 14 together with the previous gain values.

After the steps of updating and storing the gain value are completed, the procedure returns to step ST.01, and the following steps are repeated under the new gain value. Since the gain value has been changed, the response signals from the detector 2 and the compensation-driving-force detector 11 and the shapes of the graphs shown in FIGS. 10 and 12 are also changed. If the closed-loop characteristic shown in FIG. 9 and the open-loop transfer function shown in FIG. 11 are obtained, they are also changed.

The above-described processes are performed as in the previous cycle. Then, if the oscillation is detected in step ST.08, the procedure proceeds to step ST.11, which is the step of stopping the process of updating the gain value. In step ST.11, the oscillation detector 13 stops the automatic gain changer 31 in the control unit 3, reads the gain value at which the oscillation does not occur from the vibration storage 14, and sets the thus-obtained gain value in the gain changer 30 in the control unit 3, so that the state in which the oscillation does not occur is reestablished. Thus, the process of adjusting the gain value is completed.

In the case where a plurality of peaks can be observed in the response signals from the compensation-driving-force detector 11 and the detector 2 as shown in FIGS. 7 and 8, the graphs shown in FIGS. 10 and 12 are obtained. In this case, if large vibrations are detected and the vibration frequencies thereof are determined in steps ST.05 and ST.06, a notch filter or the like can be applied. The filter may be applied when the gain value is updated in step ST.10.

Figure 13:
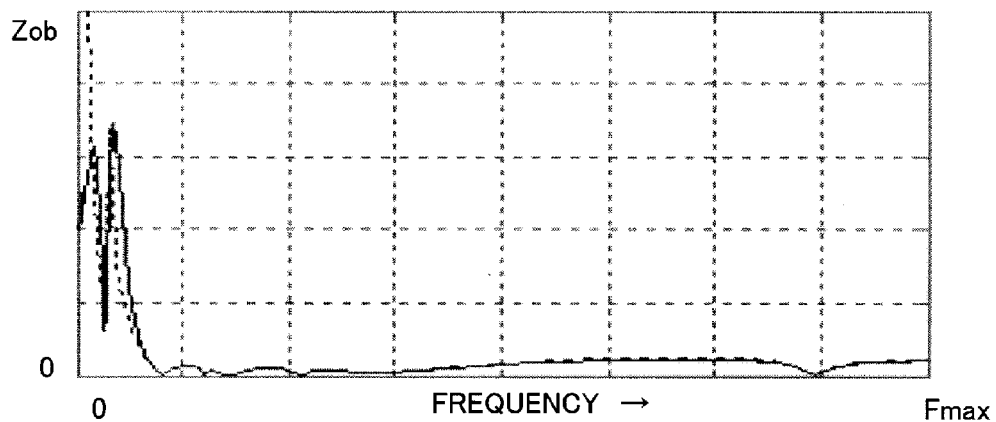
FIG. 13 is a diagram illustrating the closed-loop characteristic and the open-loop transfer function according to the first embodiment.
Figure 14:
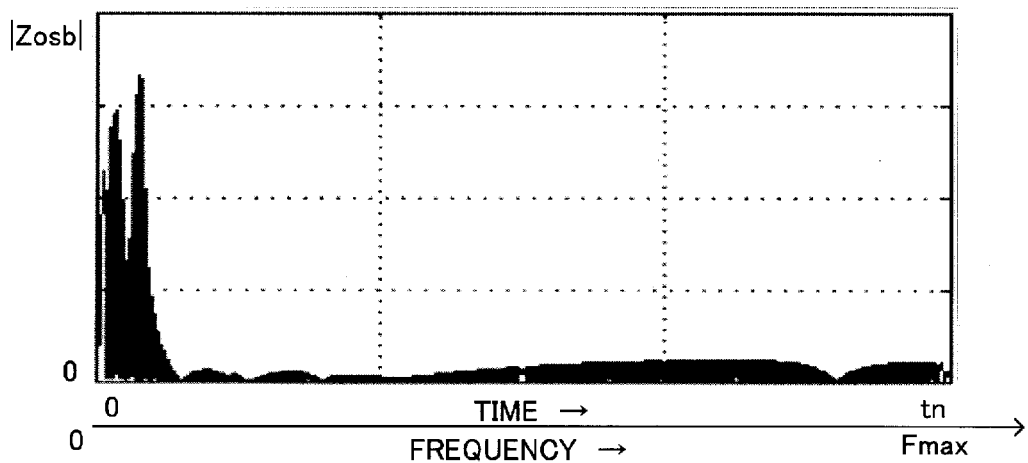
FIG. 14 is a diagram illustrating the result of simulated calculation of a gain curve of the open-loop transfer function based on the driving force before the addition of the disturbance signal according to the first embodiment.

FIG. 13 is a diagram illustrating the closed-loop characteristic and the open-loop transfer function according to the first embodiment, and FIG. 14 is a diagram illustrating the result of the simulated calculation of the gain curve of the open-loop transfer function based on the driving force before the addition of the disturbance signal according to the first embodiment.

FIG. 13 shows the result obtained by applying a filter to the case shown in FIG. 11, and FIG. 14 shows the result obtained by applying a filter to the case shown in FIG. 12. Thus, an adjustment of changing the gain value of the control unit 3 can be performed.

Figure 15:
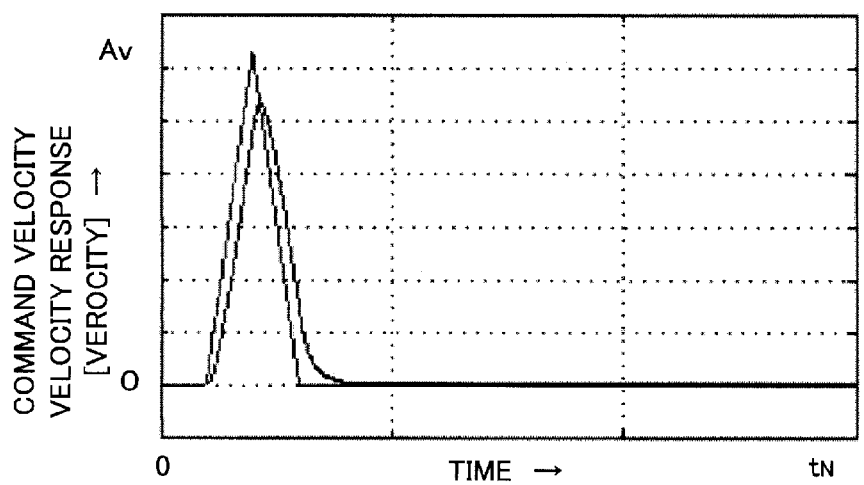
FIG. 15 is a diagram illustrating the command velocity and velocity response in a positioning operation according to the first embodiment.

FIG. 15 is a diagram illustrating the command velocity and velocity response in a positioning operation according to the first embodiment. FIG. 15 shows the response obtained when the gain value is low.

The responsiveness of the control unit 3 can be increased and the positioning time can be reduced by performing the above-described gain adjustment.

Figure 16:
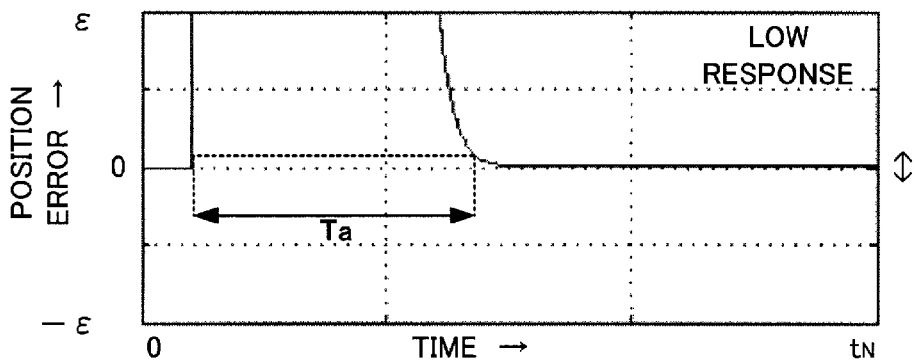
FIG. 16 is a diagram illustrating the position error in the positioning operation according to the first embodiment (low response)
Figure 17:
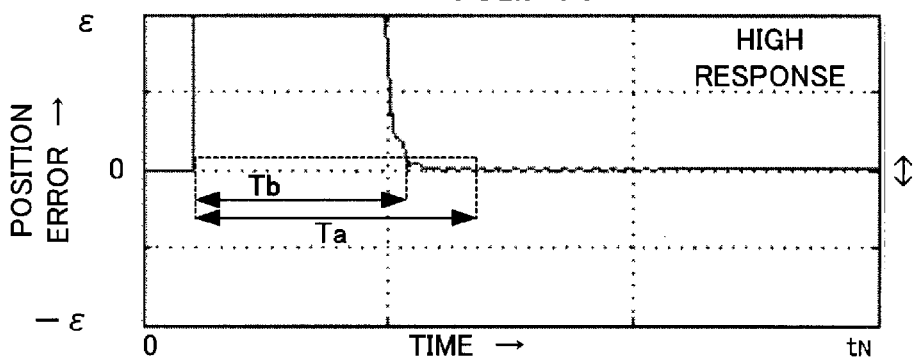
FIG. 17 is a diagram illustrating the position error in the positioning operation according to the first embodiment (high response)
Figure 18:
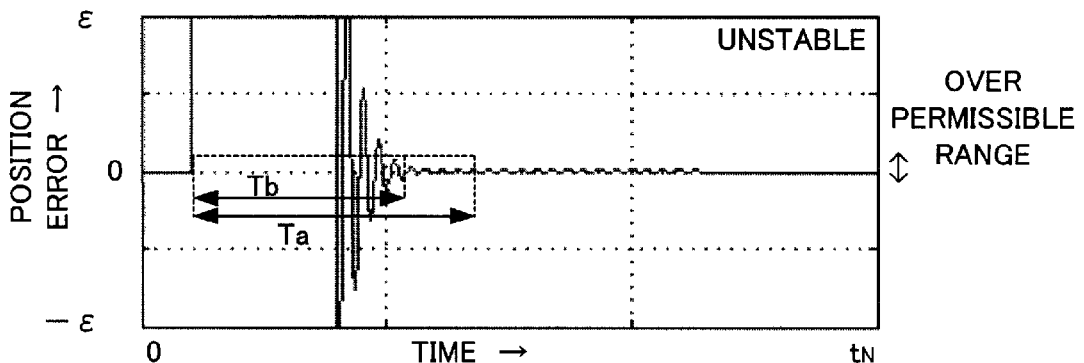
FIG. 18 is a diagram illustrating the position error in the positioning operation according to the first embodiment (unstable)

FIGS. 16, 17, and 18 are diagrams illustrating the position error in the positioning operation according to the first embodiment. The position error is a difference between the position corresponding to the operation command and the actual operation position.

FIG. 16 shows the case in which the gain adjustment is not yet performed and the gain value is low. FIG. 17 shows the case in which the gain adjustment is performed and the gain value is high. FIG. 18 shows the case in which the gain value is further increased after the gain adjustment. It can be determined that the positioning operation has been completed if the position error is reduced to within an allowable range that is equal to or less than a certain value. In FIG. 16, although an oscillation of the feedback loop does not occur and the stability is ensured, the positioning time Ta is long because the gain is low. In FIG. 17, since the gain value is increased within a range in which the oscillation of the feedback loop does not occur, the positioning time is reduced to Tb (<Ta). In FIG. 18, the gain value is excessively increased so that the oscillation of the feedback loop occurs to some extent. Although the actual position reaches the target position in a short time, vibration occurs and it takes a long time for the position error to be reduced to within the allowable range. Therefore, the positioning time is substantially equal to Tb. In particular, in the mechanism or application in which the overshoot causes a problem, the setting of FIG. 18 cannot be applied to the actual machine.

According to the first embodiment, the gain curve of the open-loop transfer function regarding the change in the gain is obtained by simulated calculation, and the gain adjustment is performed on the basis of the first threshold regarding the magnitude of vibration and the second threshold regarding the vibration frequency.

A second embodiment of the present invention will now be described with reference to the drawings.

Figure 19:
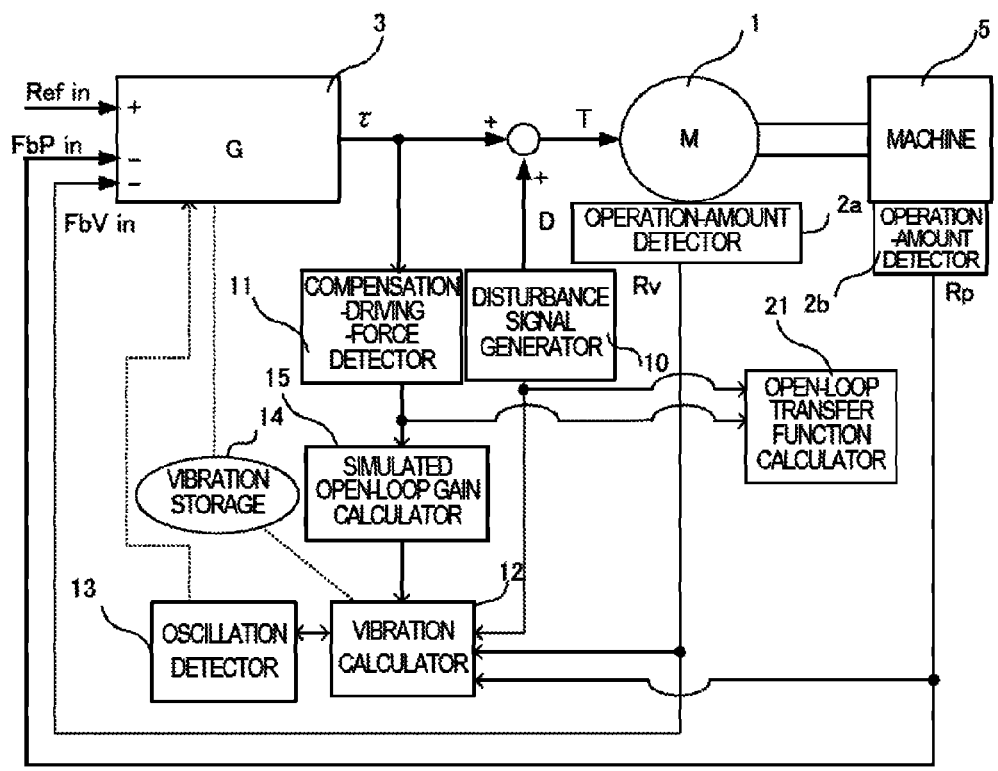
FIG. 19 is a diagram illustrating the structure of a motor controller according to a second embodiment.

FIG. 19 is a diagram illustrating the structure of a motor controller according to a second embodiment.

Figure 20:
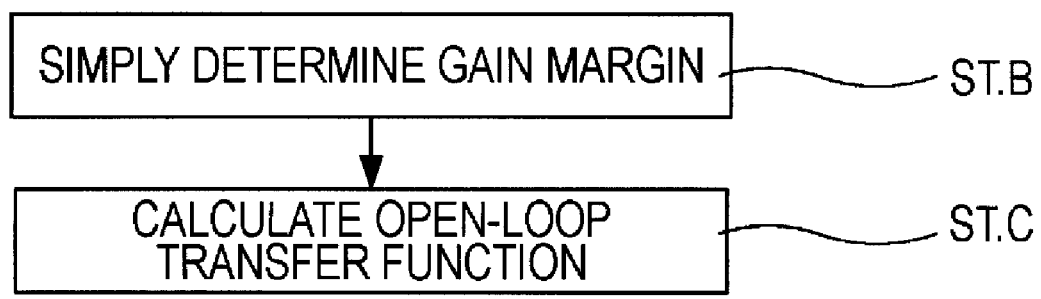
FIG. 20 is a flowchart illustrating a schematic procedure of a gain adjusting method for the motor controller according to the second embodiment.
Figure 21:
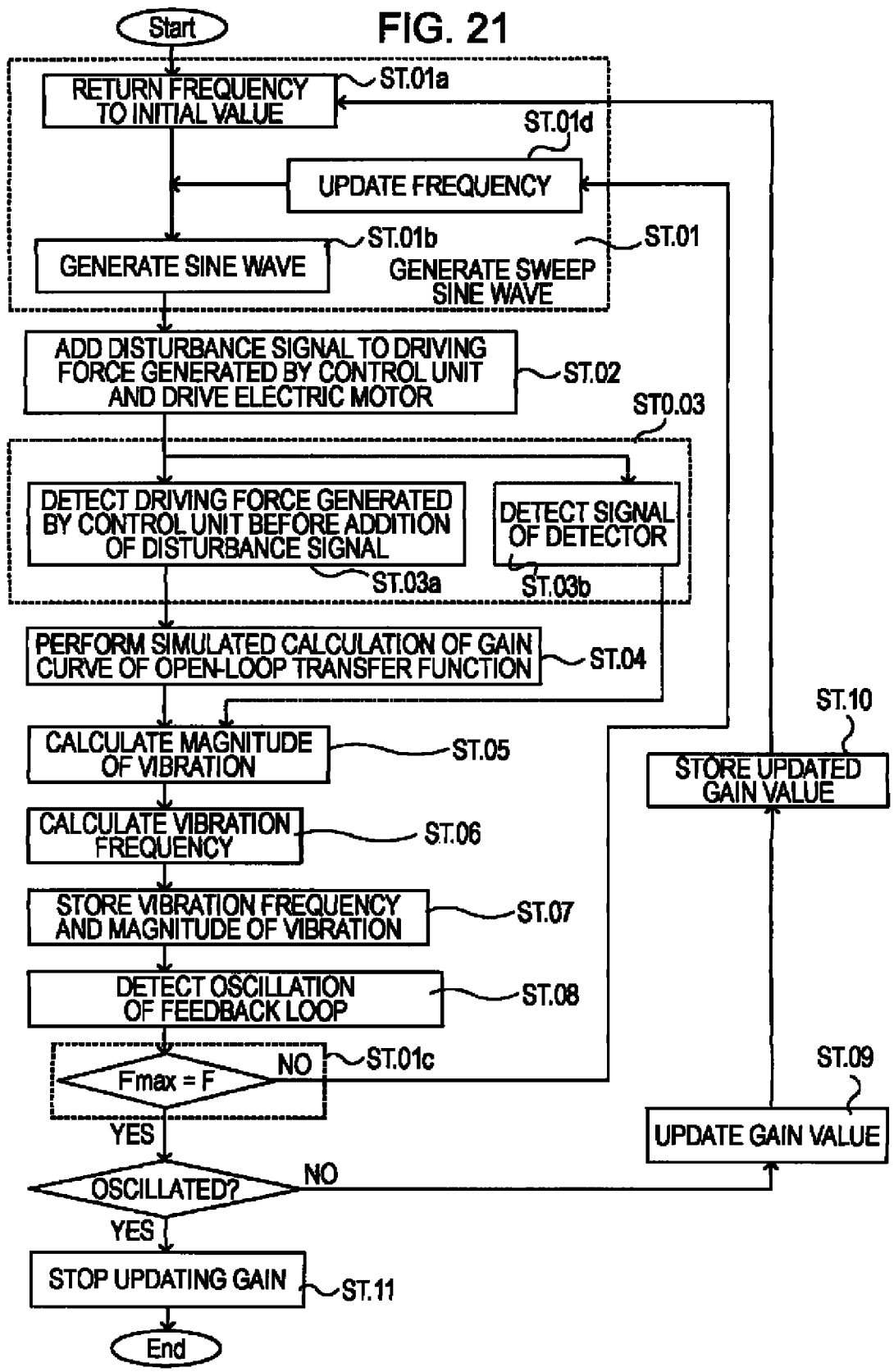
FIG. 21 is a flowchart illustrating the detailed procedure of the gain adjusting method for the motor controller according to the second embodiment.

FIG. 20 is a flowchart illustrating a schematic procedure of a gain adjusting method for the motor controller according to the second embodiment, and FIG. 21 is a flowchart illustrating a detailed procedure of the gain adjusting method for the motor controller according to the second embodiment.

In FIG. 19, reference numeral 21 denotes an open-loop transfer function calculator, and 2a and 2b denote operation-amount detectors. In addition, in FIG. 20, ST.B is a step of simply evaluating a gain margin, and ST.0 is a step of calculating an open-loop transfer function. In addition, in FIG. 21, ST.01a is a step of returning a frequency to an initial value, ST.01b is a step of generating a sine wave, ST.01c is a step of determining whether the upper frequency limit has been reached, and ST.01d is a step of updating the frequency.

The second embodiment differs from the first embodiment in that the open-loop transfer function calculator 21 is provided, that the two detectors 2a and 2b, which are the operation-amount detector 2a for detecting an amount of operation of the electric motor 1 and the operation-amount detector 2b for detecting an amount of operation of the machine 5, are provided, and that a full-closed feed back is structured.

Step ST.B, which is the step of simply evaluating the gain margin, is equivalent to the processes according to the first embodiment. However, in the second embodiment, Step ST.B differs from the processes according to the first embodiment in that step ST.01, which is the step of generating the sweep sine wave, according to the first embodiment of the present invention is divided into four steps, i.e., step ST.01a of returning the frequency to the initial value, step ST.01b of generating a sine wave, step ST.01*c* of determining whether the upper frequency limit has been reached, and step ST.01*d* of updating the frequency.

In the structure shown in FIG. 19, step ST.B shown in FIG. 20, which is the step of simply evaluating the gain margin, is performed using the same components as those used in the first embodiment. In addition, the open-loop transfer function calculator 21, which is not included in the structure of the first embodiment, is used to perform step ST.C, which is the step of calculating the open-loop transfer function. In step ST.B, the gain is simply adjusted at a high speed. In step ST.C, the result of the gain adjustment is confirmed.

Step ST.B, which is the step of simply evaluating the gain margin and which is equivalent to the processes according to the first embodiment, will be described with reference to FIG. 21 by comparing the step with the processes according to the first embodiment.

In the first embodiment, the sweep sine wave shown in FIG. 6 is generated to obtain the responses shown in FIGS. 7 and 8, and the process shown in FIG. 12 is performed to determine the magnitude of vibration and the vibration frequency. Then, the oscillation is detected on the basis of two kinds of thresholds.

In the second embodiment, the disturbance signal is obtained by increasing the frequency of a sine wave stepwise in $N_{max}$ steps from 0 Hz to Fmax Hz, by Fmax/$N_{max}$ every tn seconds, so that the frequency changes in tn×$N_{max}$ seconds in total. In the first step from 0 to tn seconds, the disturbance signal is a sine wave with a frequency of $f_1$. In the next step from tn to tn×2 seconds, the disturbance signal is a sine wave with a frequency of $f_2$. In the Nth step from tn×(N−1) to tn×N seconds, the disturbance signal is a sine wave with a frequency of $f_N$. Thus, the processes similar to those in the first embodiment are performed for each of the sine waves with constant frequencies while the frequency is changed.

In step ST.B, which is the step of simply evaluating the gain margin, the frequency is set to the initial value in step ST.01*a*, which is the step of returning the frequency to the initial value. Then, the sine wave is generated in step ST.01*b*, which is the step of generating the sine wave.

Then, similar to the first embodiment, the procedure proceeds to step ST.02, which is the step of adding the disturbance signal to the driving force generated by the control unit 3 and driving the electric motor 1, and the electric motor 1 is driven accordingly. At this time, the command input (input to Refin in FIG. 1) supplied to the control unit 3 may be set to 0.

In step ST.03*a*, which is the step of detecting the driving force generated by the control unit 3 and step ST.03*b*, which is the step of detecting the signal of the detector 2*a*, the operation-amount detector 2*a* detects the amount of operation of the electric motor 1 and feeds the detected amount of operation to the control unit 3. The control unit 3 outputs a compensation driving force which compensates for the amount of operation of the electric motor 1 so that the output becomes equal to the command input 0 supplied to the control unit 3. Since the disturbance signal is a sine wave with the constant frequency, the response signals detected by the operation-amount detector 2*a* and the compensation-driving-force detector 11 also have a constant vibration frequency equal to the input frequency.

Then, also in step ST.04, which is the step of performing simulated calculation of the gain curve of the open-loop transfer function, a process similar to that in the first embodiment is performed. However, a graph similar to that shown in FIG. 12 according to the first embodiment cannot be obtained, and only the value of a gain (absolute value of amplitude) at a certain point on the horizontal axis in FIG. 12 (a minimum frequency set as the initial value) is obtained.

In step ST.05, which is the step of detecting the magnitude of vibration, the gain (absolute value of amplitude) is recognized. In step ST.06, which is the step of detecting the vibration frequency, the input frequency, which is already known, is recognized again. The thus-obtained values are stored in step ST.07, which is the step of storing the vibration frequency and the magnitude of vibration. In the second embodiment, the magnitude of vibration for each of the input frequencies is stored in the vibration storage 14.

Next, the procedure proceeds to step ST.08, which is the step of detecting an oscillation of the feedback loop. In step ST.08, a process similar to that in the first embodiment is performed. The occurrence of oscillation may be detected and stored in the vibration storage 14. However, if the maximum frequency has not yet been reached, the following process is not changed in accordance with the occurrence of oscillation. If it is determined that the maximum frequency has not yet been reached in step ST.01*c*, which is the step of determining whether the upper frequency limit has been reached, the procedure proceeds to step ST.01*d*, which is the step of updating the frequency, and returns to step ST.01*b*, which is the step of generating a sine wave. Thus, the processes similar to those in the first embodiment are performed for each frequency.

If it is determined that the maximum frequency has been reached in step ST.01*c* performed after step ST.08, it is determined whether or not an oscillation has occurred while the frequency has been increased from the initial value to the maximum value.

If the oscillation has not occurred, the procedure proceeds to step ST.09, which is the step of updating the gain value. After the gain value of the control unit 3 is updated, the procedure proceeds to step ST.10, which is the step of storing the updated gain value, and the updated gain value is stored in the vibration storage 14 together with the previous gain values.

When the process of updating and storing the gain value is completed, the procedure returns to step ST.01. Then, the process is repeated from step ST.01*a* from the initial frequency.

If the oscillation has occurred, the procedure proceeds to step ST.11, which is the step of stopping the process of updating the gain value. Thus, similar to the first embodiment, the process of adjusting the gain value is completed.

After step ST.B, which is the step of simply evaluating a gain margin, is completed, step ST.C, which is the step of calculating the open-loop transfer function, is performed as shown in FIG. 20.

Figure 22:
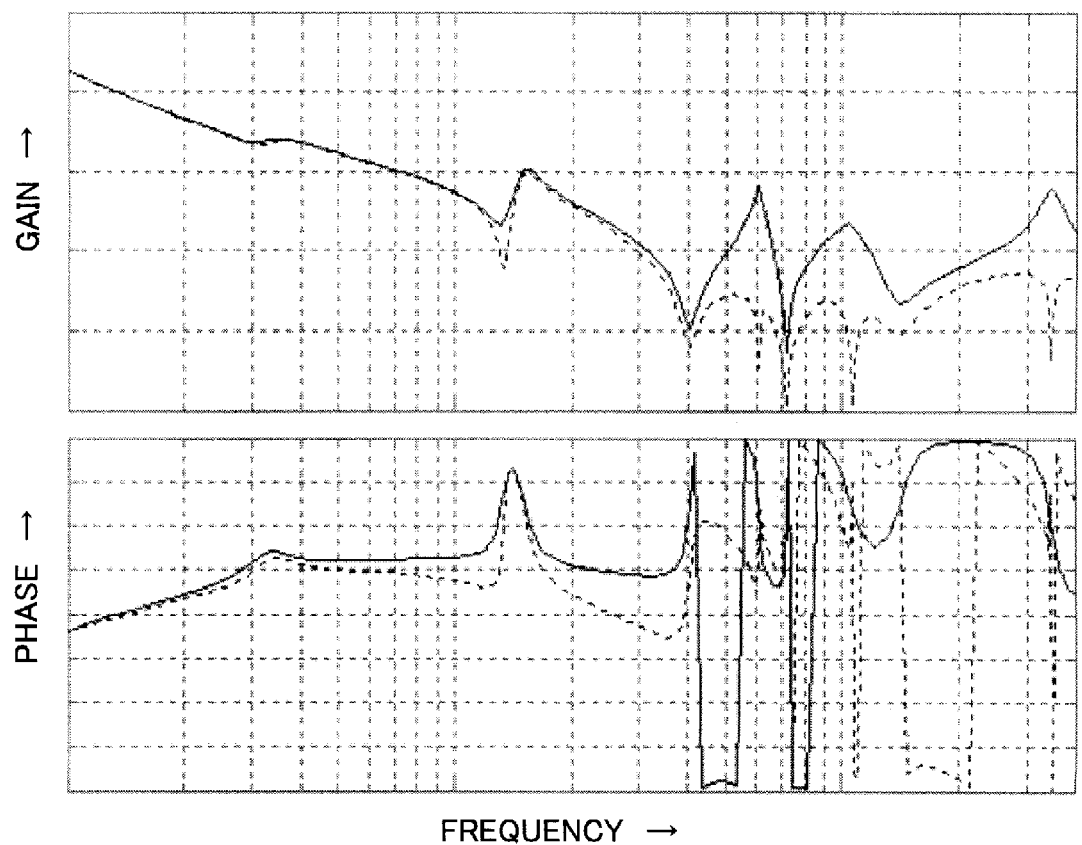
FIG. 22 is a diagram illustrating an open-loop transfer function of the motor controller according to the second embodiment.

FIG. 22 is a diagram illustrating an open-loop transfer function of the motor controller according to the second embodiment. The gain adjustment which involves the process of increasing and reducing the gain value is performed in step ST.B. In step ST.C, similar to the related art, the result of gain adjustment is quantitatively confirmed.

In FIG. 22, the solid and broken lines respectively show the cases in which a filter is absent and present as in FIGS. 11 and 13 and FIGS. 12 and 14 in the first embodiment. Note that, in FIG. 22, unlike FIGS. 10 to 14, logarithmic scales are used on the vertical and horizontal axes.

Thus, the open-loop transfer function varies in accordance with the gain adjustment. In addition, as shown in FIG. 22, the state of application of the filter can also be evaluated in step ST.C.

In the second embodiment, the sine wave having a constant frequency in each step is used as the disturbance signal D.

However, the disturbance signal D may also be a sweep sine wave which has a continuous frequency between successive steps.

In addition, the disturbance signal D is not limited to the sine wave. For example, a random wave including a frequency-range component with frequencies higher than the frequency range of the open-loop transfer function Zo to be obtained, an M-sequence signal, etc., may be used to excite the electric motor 1 and the machine 5. Then, the response may be detected by the detector 2*b* and the open-loop transfer function Zo may be determined from Equations (1) and (2) shown above.

Since the motor controller is structured as described above, the gain can be adjusted such that the operation of the motor controller shown in FIG. 17 according to the first embodiment can be finally obtained.

A third embodiment of the present invention will now be described with reference to the drawings.

Figure 23:
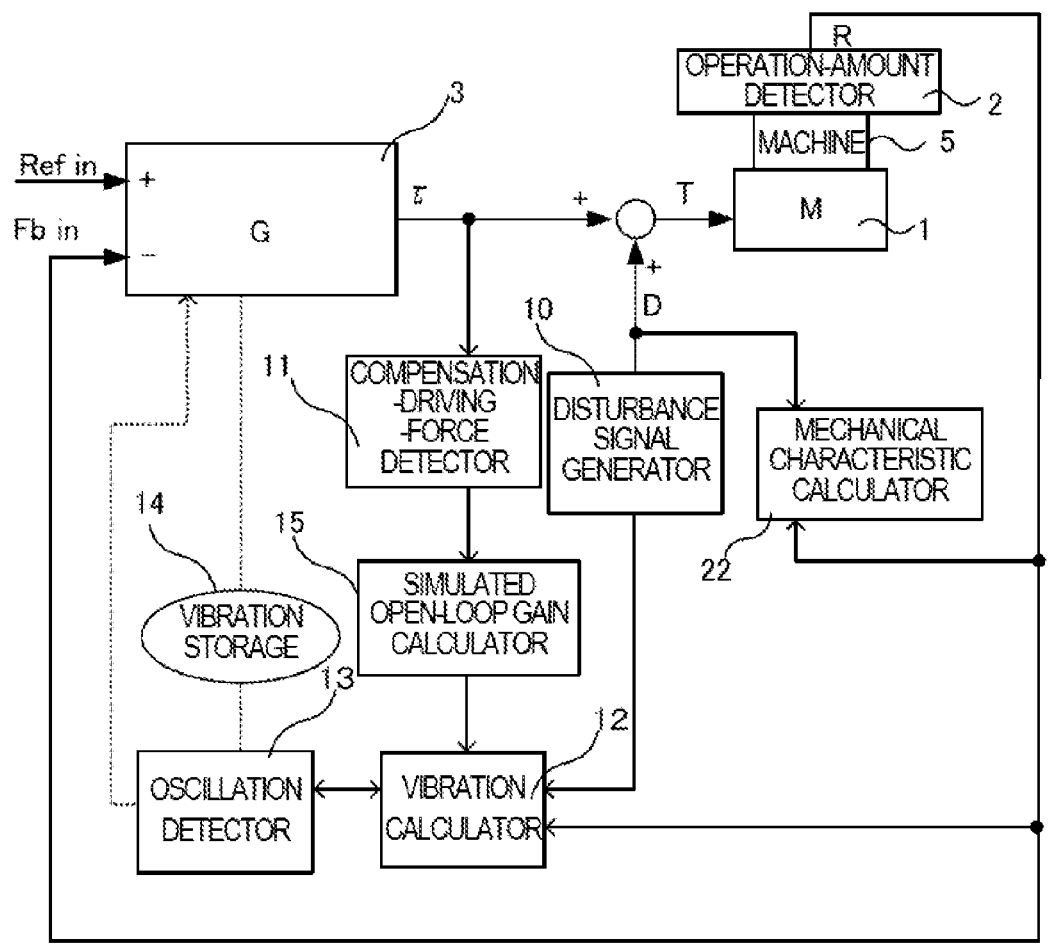
FIG. 23 is a diagram illustrating the structure of a motor controller according to a third embodiment.
Figure 24:
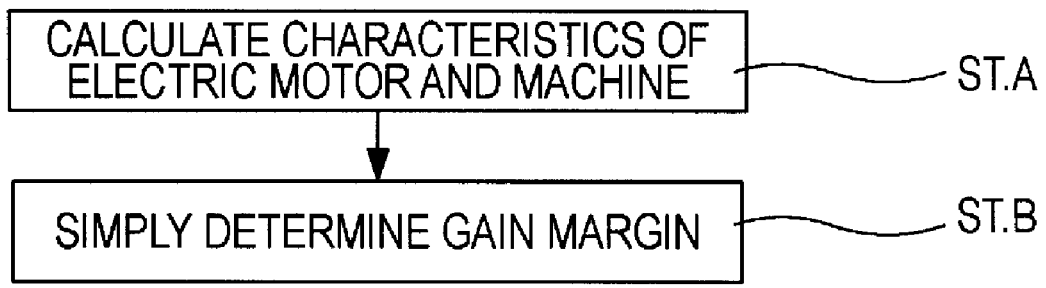
FIG. 24 is a flowchart illustrating a schematic procedure of a gain adjusting method for the motor controller according to the third embodiment.

FIG. 23 is a diagram illustrating the structure of a motor controller according to a third embodiment, and FIG. 24 illustrates a schematic procedure of a gain adjusting method for the motor controller according to the third embodiment.

In FIG. 23, reference numeral 22 denotes a mechanical characteristic calculator. In FIG. 24, step ST.A is a step of calculating the characteristics of the electric motor and the machine.

The third embodiment differs from the first embodiment in that the mechanical characteristic calculator 22 is provided. In addition, the relationship between the electric motor 1, the operation-amount detector 2, and the machine 5 shown in FIG. 23 also differs from that in the first embodiment. The electric motor 1 is a linear electric motor, and the machine 5 is directly driven by the electric motor 1. The operation-amount detector 2 is structured such that the amount of operation of the machine 5 is fed back to the control unit 3.

Step ST.A shown in FIG. 24, which is the step of calculating the characteristics of the electric motor and the machine, differs from the process performed in the first embodiment.

The third embodiment differs from the second embodiment in that the open-loop transfer function calculator 21 is not provided and the mechanical characteristic calculator 22 is provided. In addition, the third embodiment also differs from the second embodiment in that step ST.C, which is the step of calculating an open-loop transfer function, is not performed and step ST.A, which is the step of calculating the characteristics of the electric motor and the machine, is performed.

Step ST.B shown in FIG. 24, which is the step of simply evaluating the gain margin, is equivalent to the processes according to the first embodiment. In this step, either the processes shown in FIG. 3 according to the first embodiment or the processes shown in FIG. 21 according to the second embodiment may be performed. The processes performed in Step ST.B, which is the step of simply evaluating the gain margin, are similar to the processes shown in FIG. 3 according to the first embodiment or the processes shown in FIG. 21 according to the second embodiment.

Alternatively, in step ST.B, which is the step of simply evaluating the gain margin, the procedure of the gain adjusting method shown in FIG. 21 may be improved. In FIG. 21, the process of generating the sine wave is included in a loop for updating the gain value after the detection of oscillation. However, the process of generating the sine wave may also be placed outside the loop for updating the gain value. In such a case, a process of returning the gain value to the initial value must be performed in the loop for updating the gain value.

In addition, although the magnitude of vibration is shown by the absolute value in FIGS. 10, 12, and 14 according to the first embodiment, the magnitude of vibration may also be shown by the square value. Alternatively, a square root of the square value may also be used.

In the third embodiment, step ST.A, which is the step of calculating the characteristics of the electric motor and the machine, is performed before step ST.B, which is the step of simply evaluating a gain margin.

Figure 25:
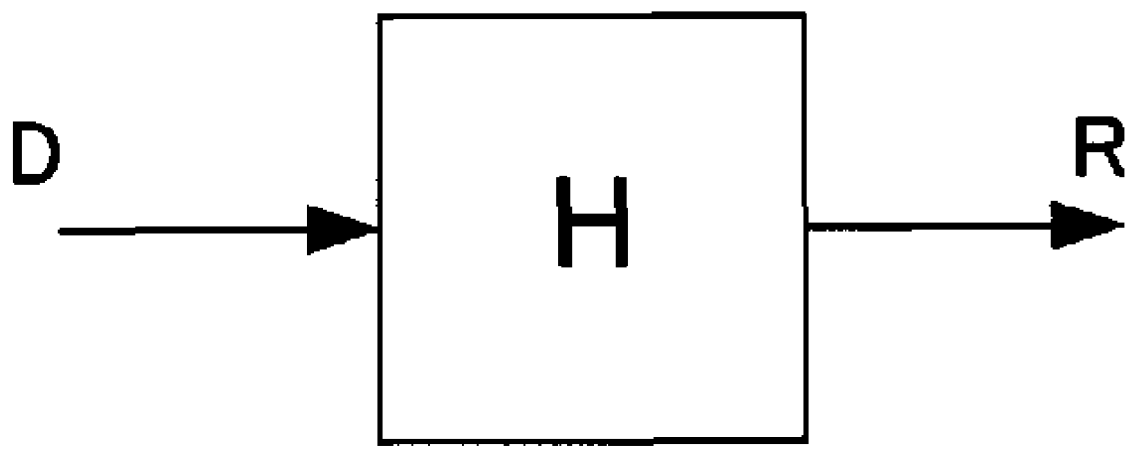
FIG. 25 is a simplified block diagram illustrating the calculation of characteristics of an electric motor and a machine performed by a mechanical characteristic calculator included in the motor controller according to the third embodiment.

FIG. 25 is a simplified block diagram illustrating the calculation of characteristics of the electric motor and the machine performed by the mechanical characteristic calculator included in the motor controller according to the third embodiment. The mechanical characteristic H is determined from the disturbance signal D and the response signal R. The disturbance signal D is not limited to the sine wave, and a random wave including a frequency-range component with the frequency range of the mechanical characteristic H to be obtained, an M-sequence signal, etc., may also be used to excite the electric motor 1 and the machine 5. Then, the response is detected by the detector 2*b*, and the mechanical characteristic H is determined from Equation (3).

More specifically, frequency analysis of the disturbance signal D and the response signal R is performed to obtain $S_D(\omega)$ and $S_R(\omega)$. Then, $S_D(\omega)$ and $S_R(\omega)$ are multiplied by complex conjugates $S_D^*(\omega)$ of $S_D(\omega)$ so that auto-power spectrum $A_{D,D}$ and cross spectrum $X_{R,D}$ are obtained. Then, $A_{D,D}$ and $X_{R,D}$ are averaged over N samples, and the cross spectrum is divided by the auto-power spectrum. As a result, the mechanical characteristic H is obtained (the bars above X and A show that they are averaged).

Equations (1) and (2) may also be applied in a similar manner, although the processed signal is different form that in the above-described case.

$$H(\omega) = \frac{\frac{1}{n} \cdot \sum_{i}^{n} S_R(\omega)_i \cdot S_D^*(\omega)_i}{\frac{1}{n} \cdot \sum_{i}^{n} S_D(\omega)_i \cdot S_D^*(\omega)_i} = \frac{\overline{X}_{R,D}}{\overline{A}_{D,D}} \qquad \text{Eq. (3)}$$

FIG. 26 is a diagram illustrating the characteristics of the electric motor and the machine in the motor controller according to the third embodiment. If step ST.A (FIG. 24), which is the step of calculating the characteristics of the electric motor and the machine, is performed in advance, the result shown in FIG. 26 can be obtained. Therefore, as shown in FIG. 14 according to the first embodiment, the filter may be provided by the control unit 3 in advance. In addition, the ranges in which the comparison with first threshold and the second threshold is performed can be recognized in advance.

After step ST.A is performed, step ST.B, which is the step of simply evaluating the gain margin, according to the first embodiment or the second embodiment is performed. As a result, the gain can be adjusted such that the operation of the motor controller shown in FIG. 17 according to the first embodiment can be finally obtained.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A motor controller for driving an electric motor comprising:

a control unit configured to receive a detection signal from an operation-amount detector and configured to generate a driving force for driving the electric motor in response to a command signal, the operation-amount detector being configured to detect an amount of operation of the electric motor or a machine, the control unit being configured to provide a feedback loop for controlling the electric motor such that the amount of operation matches the command signal;

a disturbance signal generator configured to add a disturbance signal to the driving force generated by the control unit;

a compensation-driving-force detector configured to detect the driving force generated by the control unit;

a vibration calculator configured to calculate a magnitude of vibration and a vibration frequency, the magnitude of vibration being calculated on the basis of an absolute value or a square value of a signal detected by the compensation-driving-force detector or the operation-amount detector; and an oscillation detector configured to detect an oscillation of the feedback loop by evaluating the signal detected by the compensation-driving-force detector or the operation-amount detector on the basis of at least one first predetermined threshold based on a magnitude of the signal detected by the compensation-driving-force detector or the operation-amount detector and at least one second predetermined threshold based on the vibration frequency.

2. The motor controller according to claim 1, further comprising:

a simulated open-loop gain calculator configured to perform simulated calculation of a gain curve of an open-loop transfer function using the signal from the compensation-driving-force detector.

3. The motor controller according to claim 2, wherein the disturbance signal added by the disturbance signal generator to the driving force generated by the control unit is a sweep sine wave.

4. The motor controller according to claim 3, wherein the vibration calculator calculates the vibration frequency at a time point at which the magnitude of vibration is large on the basis of the signal detected by the compensation-driving-force detector or the operation-amount detector.

5. The motor controller according to claim 1, wherein the control unit includes a gain changer configured to change responsiveness of the control unit.

6. The motor controller according to claim 5, further comprising:

a vibration storage configured to store the vibration frequency and the magnitude of vibration detected by the vibration calculator.

7. The motor controller according to claim 6, wherein the vibration storage is configured to store a gain value of the gain changer.

8. The motor controller according to claim 7, wherein the control unit includes an automatic gain changer configured to automatically change the gain value of the gain changer and configured to stop changing the gain value in response to a signal from the oscillation detector, the automatic gain changer being configured to return the gain value to a gain stored in the vibration storage.

9. The motor controller according to claim 1, wherein the disturbance signal generator is configured to add a disturbance signal including a wide-range frequency component to the driving force generated by the control unit.

10. The motor controller according to claim 9, further comprising:

an open-loop transfer function calculator configured to calculate an open-loop transfer function on the basis of the signal from the compensation-driving-force detector and a signal from the disturbance signal generator.

11. The motor controller according to claim 9, further comprising:

a mechanical characteristic calculator configured to calculate characteristics of the electric motor and the machine driven by the electric motor on the basis of the signal from the operation-amount detector and a signal from the disturbance signal generator.

* * * * *